March 7, 1944. H. D. PORTER ET AL 2,343,704
HETEROCYCLIC SUBSTITUTED IMINOPYRAZOLONE COUPLERS
Filed Oct. 15, 1942
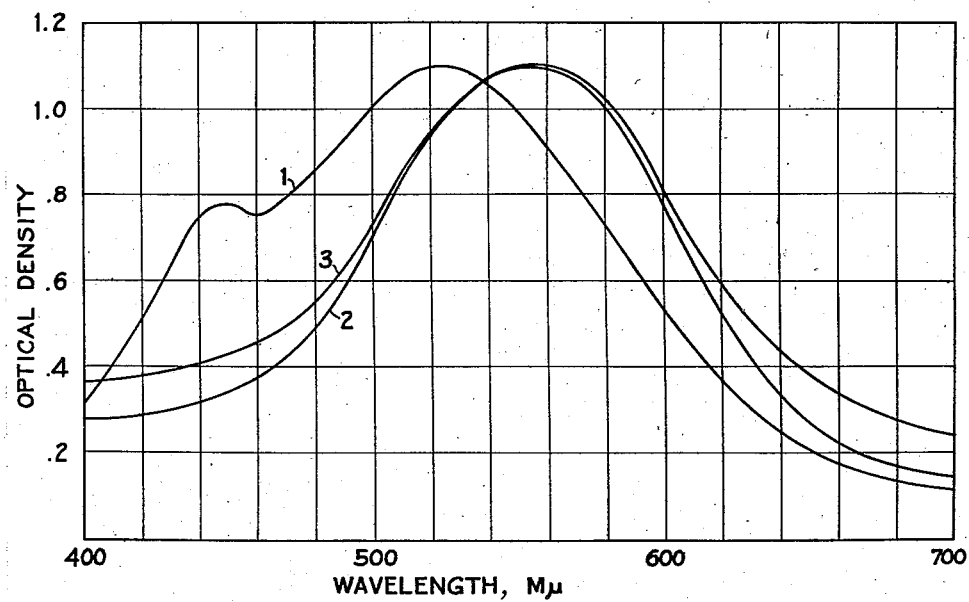
HENRY D. PORTER
PAUL W. VITTUM
ARNOLD WEISSBERGER
INVENTORS
BY
ATTORNEYS

UNITED STATES PATENT OFFICE 2,343,704

HETEROCYCLIC SUBSTITUTED IMINO-PYRAZOLONE COUPLER

Henry D. Porter, Paul W. Vittum, and Arnold Weissberger, Rochester, N. Y., assignors to Eastman Kodak Company, Rochester, N. Y., a corporation of New Jersey Application October 15, 1942, Serial No. 462,068
In Great Britain November 20, 1941

6 Claims. (Cl. 95—6)

This invention relates to photographic color forming compounds and particularly to pyrazoloneimides containing heterocyclic substituents.

The formation of colored photographic images by coupling the development product of aromatic amino developing agents with color forming or coupling compounds is well known. In these processes, the subtractive process of color formation is ordinarily used and the image dyes are intended to be of the complementary primary colors cyan or blue-green, magenta and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols depending upon the composition of the coupler and of the developer.

One of the characteristic features of the dyes produced on coupling using pyrazolone couplers is the secondary absorption peak in the blue region of the spectrum. Since the magenta dyes produced from pyrazolone couplers are intended to transmit blue light, this absorption in the blue region of the spectrum is an undesirable feature of the dyes made from pyrazolone couplers. If this absorption peak in the blue region of the spectrum could be eliminated, the pyrazolone couplers would be more desirable for purposes of color photography.

It is, therefore, an object of the present invention to provide novel photographic coupler compounds producing dyes which have desirable light transmission characteristics for color photography. A further object is to provide novel magenta couplers producing dyes having reduced light absorption in the blue region of the spectrum. Other objects will appear from the following description of our invention.

These objects are accomplished by the use as coupler compounds of pyrazoloneimides having a heterocyclic nucleus in the 1-position of the pyrazolone ring.

In the accompanying drawing, the single figure is a graph showing the light absorption characteristics of a typical prior art dye and of dyes formed from couplers according to the present invention.

The couplers which we propose to use have the following general formula:

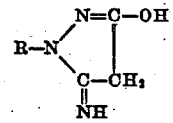

where R = a heterocyclic nucleus.

The following examples illustrate typical compounds suitable for use according to our invention:

(1)

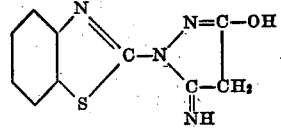

1-(2'-benzothiazolyl)-3-hydroxy-5-pyrazoloneimide (2)

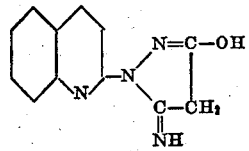

1-(α-quinolyl)-3-hydroxy-5-pyrazoloneimide (3)

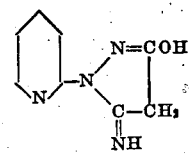

1-(α-pyridyl)-3-hydroxy-5-pyrazoloneimide

The novel couplers of our invention are produced by condensation of a heterocyclic hydrazine with cyanoacetic ester in the presence of alkali alcoholate. For instance, 30 grams of ethyl cyanoacetate and 43.5 grams of 2-benzothiazolylhydrazine (German Patent 614,327), were added to a solution of sodium ethylate (12 grams of sodium in 250 cc. of absolute ethanol). The mixture was stirred and refluxed in an oil bath at 120° for twenty hours, then dissolved in 1.25 liters of water on the steambath, acidified hot with acetic acid and cooled, to yield 50 grams of crude material. This was purified by extracting with hot dioxane, throwing out of the filtrate with an equal volume of water and then taking through alkali. Yield, 23 grams (40%) of 1-(2'-benzothiazolyl) - 3 - hydroxy-5-pyrazoloneimide; M. P. 233–235° dec.

The couplers are also formed according to the following series of reactions, which establishes their structure (Het=heterocyclic nucleus):

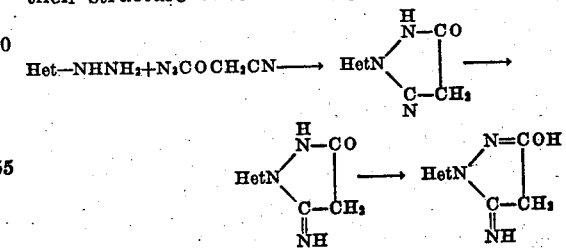

For instance: to a solution of 8.25 grams of 2-benzothiazolylhydrazine in 200 cc. of dioxane was added 5.5 grams of cyanoacetazide (J. prakt. Chem., 92, 297 (1915)). After stirring for one hour it was filtered and washed with dioxane; yield, 7.7 grams (67%) of β-cyanoacetyl-2-benzothiazolylhydrazine, M. P. 195–196°. Recrystalization raised the M. P. to 200–201°. Of this 6.8 grams were refluxed in sodium methylate (1.35 grams sodium in 40 cc. of methanol) for one hour. After forming a clear solution by the addition of 25 cc. of water, it was acidified and the product extracted with 50 cc. of 95% ethanol to yield 2.9 grams (43%) of 1-(2'-benzothiazolyl)-3-hydroxy-5-pyrazoloneimide, M. P. and mixed M. P. with the sample above 233–235° dec. Similarly α-quinolylhydrazine (J. Chem. Soc., 103, 1978 (1913)) in the above two methods of preparation gives 1-α-quinolyl-3-hydroxy-5-pyrazoloneimide, M. P. 217–219° dec., and α-pyridylhydrazine (J. Chem. Soc. 107, 691 (1917)) gives 1-α-pyridyl-3-hydroxy-5-pyrazoloneimide, M. P. 185–187°.

Our couplers are designed for use in processes in which the coupler is incorporated in the developing solution such as those described in Mannes and Godowsky U. S. Patent 2,113,329, granted April 5, 1938, or Mannes, Godowsky and Wilder U. S. Patent 2,252,718, granted August 19, 1941. Certain of the couplers of our invention may be incorporated in sensitive emulsion layers for use in processes such as those described in Fischer U. S. Patent 1,055,155, granted March 4, 1913, Mannes and Godowsky U. S. Patents 2,304,939 and 2,304,940, granted December 15, 1942, and Jelley and Vittum U. S. Patent 2,322,027, granted June 15, 1943.

The following example illustrates developing solutions containing the couplers used according to our invention:

*Example*

A. 2-amino-5-diethylaminotoluene hydrochloride _____ grams__ 2
  Sodium sulfite (anhydrous) _____ do____ 2
  Sodium carbonate (anhydrous) ___ do____ 20
  Potassium bromide _____ do____ 1
  Water to _____ liter__ 1

B. 1-(2'-benzothiazolyl)-3-hydroxy-5-imino-pyrazolone _____ grams__ 1.5
  Sodium hydroxide (10% solution) __cc___ 10

B is added to A

The foregoing example refers to the addition of the coupler compound to the developing solution itself. The coupler may also be added to the emulsion layer provided that suitable means are used to prevent its diffusion in the case of multi-layer coatings. Special dispersing agents may be used for incorporating the coupler compound in the emulsion and in certain cases the coupler may be absorbed or adsorbed to the sensitive salt or may be combined with the sensitive salt as a chemical combination.

One of the advantages of the couplers used according to our invention is that the dyes formed from them have greater blue light transmission than those from pyrazolone couplers previously used. In the accompanying drawing, absorption curves of a dye formed from a prior art aminopyrazolone coupler and two dyes formed from heterocyclic substituted iminopyrazolone couplers are shown. These curves were prepared from emulsion coatings in which the dyes were formed using the developing formula of the example of the present application but substituting the following couplers in each case:

Curve 1.—1-phenyl-3-amino-5-pyrazolone
Curve 2.—1-(α-quinolyl)-3-hydroxy-5-pyrazoloneimide
Curve 3.—1-(2'-benzothiazolyl)-3-hydroxy-5-pyrazoloneimide The dye of Curve 1 from the coupler having a phenyl group in the 1-position has a secondary absorption maximum at about 450 millimicrons. This results in poor blue transmission of the dye and a similar secondary absorption has been found in the dyes produced from all pyrazolone couplers hitherto known. In the case of the couplers of the present invention, this secondary absorption is not present, as shown in Curves 2 and 3, and the blue light transmission characteristics of the dyes are greatly improved.

We are aware that both heterocyclic substituted pyrazolone couplers and iminopyrazolone couplers have been described in British Patent 478,990. However, none of the couplers described in that patent produces a dye having the superior blue light transmission characteristics of the dyes produced from the couplers of our invention. By introducing a heterocyclic group into the iminopyrazolone coupler, the light transmission characteristics of the resulting dyes are greatly improved.

In the development of exposed photographic silver halide emulsion layers, using the couplers of our invention, any color forming developer containing a primary amino group may be used. These include developers having two primary amino groups as well as those having one of the amino groups substituted or having substituents in the ring such as alkyl phenylenediamines and alkyl toluylene diamines. These compounds are usually used in the salt form such as the hydrochloride or the sulfate which are more stable than the amines themselves. The suitable compounds are diethyl-p-phenylene diamine hydrochloride, monomethyl-p-phenylene diamine hydrochloride, dimethyl-p-phenylenediamine hydrochloride and 2-amino-5-diethylaminotoluene hydrochloride. The p-amino phenols and their substitution products may also be used where the amino group is unsubstituted. All of these developers have an unsubstituted amino group which enables the oxidation products of the developer to couple with the color forming compounds to form a dye image.

Our development process may be employed for the production of colored photographic images in layers of gelatin or other carriers, such as collodion, organic esters of cellulose, or synthetic resins. The carrier may be supported by a transparent medium such as glass, a cellulose ester or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

We claim:

1. A color forming photographic developer comprising a primary aromatic amino developing agent and a 5-imino pyrazolone having a heterocyclic substituent in the 1-position.

2. A color forming photographic developer comprising a primary aromatic amino developing agent and a coupler compound having the formula:

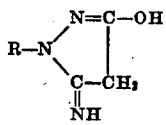

where R=a heterocyclic nucleus.

3. A color forming photographic developer comprising a primary aromatic developing agent and a coupler compound having the following formula:

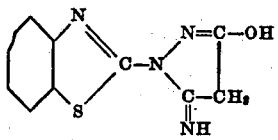

4. A color forming photographic developer comprising a primary aromatic developing agent and a coupler compound having the following formula:

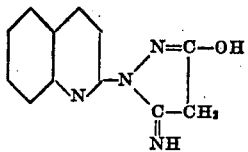

5. The method of producing a magenta colored photographic image in a gelatino silver halide emulsion layer which comprises exposing the layer and developing it with a primary aromatic amino developing agent in the presence of a coupler compound having the formula:

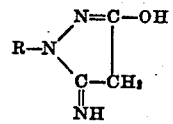

where R=a heterocyclic nucleus.

6. A photographic emulsion for forming colored images comprising a colloidal carrier containing a sensitive silver halide and a coupling compound having the formula:

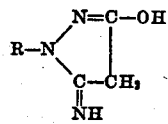

where R=a heterocyclic nucleus.

HENRY D. PORTER.
PAUL W. VITTUM.
ARNOLD WEISSBERGER.